United States Patent [19]

Parquet et al.

[11] 4,308,787
[45] Jan. 5, 1982

[54] PRIORITY FLOW DIVIDER

[75] Inventors: Donald J. Parquet; Donald R. King, both of Burlington, Iowa

[73] Assignee: J. I. Case Company, Racine, Wis.

[21] Appl. No.: 120,201

[22] Filed: Feb. 11, 1980

[51] Int. Cl.³ .............................................. F01B 25/02
[52] U.S. Cl. .......................................... 91/6; 91/516; 91/517; 137/101
[58] Field of Search ................. 91/516, 517, 518, 532, 91/29, 31, 6; 137/101, 625.68

[56] References Cited

U.S. PATENT DOCUMENTS

| Re. 30,291 | 6/1980 | Goff .................................. 91/532 |
| 2,910,971 | 11/1959 | MacDuff ...................... 137/625.68 |
| 3,568,868 | 3/1971 | Chichester ........................ 137/101 |
| 3,584,537 | 6/1971 | Schutz ................................. 91/517 |
| 3,703,186 | 11/1972 | Brewer ............................... 137/101 |
| 3,841,095 | 10/1974 | Baker ................................. 91/516 |
| 4,009,730 | 3/1977 | Starling ......................... 137/625.68 |
| 4,154,257 | 5/1979 | Adachi .............................. 137/101 |
| 4,192,337 | 3/1980 | Alderson .......................... 137/101 |

*Primary Examiner*—Abraham Hershkovitz
*Attorney, Agent, or Firm*—Cullen, Sloman, Cantor, Grauer, Scott & Rutherford

[57] ABSTRACT

A priority flow divider is disclosed for dividing hydraulic fluid flow between a steering circuit and an auxiliary circuit thereby providing better efficiency and greater productivity for the auxiliary circuit. The priority flow divider includes a cylindrical housing having a slidable spool valve therein, and the housing further includes an inlet port connected to the steering pump in the steering circuit, a discharge port connected to the steering valve, in the steering circuit, and a discharge port connected to the auxiliary hydraulic circuit. The spool valve has enlarged cylindrical portions which are connected by recessed connecting portions of a reduced diameter. When the steering valve is in its neutral or non-steering position, the enlarged cylindrical portions of the spool valve selectively engage interior wall portions of the cylindrical housing to define an interior fluid connecting chamber between the inlet port from the steering pump and the discharge port to the auxiliary circuit whereby the fluid flow from the steering pump is diverted to the auxiliary circuit except for a small pilot flow. Actuation of the steering valve causes the spool valve to be shifted to define an interior fluid connecting chamber between the inlet port from the steering pump and the discharge port to the steering valve whereby all of the fluid flow is directed to the steering valve and none to the auxiliary circuit.

1 Claim, 2 Drawing Figures

PRIORITY FLOW DIVIDER

BACKGROUND OF THE INVENTION

The present invention relates to a hydraulic control system for dividing hydraulic fluid flow between steering and auxiliary circuits, and more particularly, to a priority flow divider which provides full fluid flow to a steering valve when the valve is actuated, but when the valve is not actuated, the priority flow divider diverts all of the flow to an auxiliary circuit except for a small pilot flow.

It is common in earth-working equipment, such as backhoes, loaders, or the like, to have a bucket or shovel mounted on a tractor to be raised and lowered, tilted, or otherwise moved into the correct attitude by hydraulic cylinders supplied with fluid pressure from a suitable pump. The hydraulic systems for earth-working applications require a high volume of fluid at low pressure to rapidly move the cylindrical piston rods, and therefore, the bucket or shovel to the work.

It is conventional to provide a fluid flow divider between steering and auxiliary hydraulic circuits in fluid pressure operated load handling mechanisms such as earth-working equipment. Flow dividers have been used to provide a fixed amount of fluid flow to the steering circuit and to an auxiliary circuit. This permits the use of a fixed displacement pump for the auxiliary circuit to operate a backhoe or the like, and additional fluid flow is provided by the pump in the steering circuit to supplement the flow from the pump in the auxiliary circuit. A problem with known flow dividers is that they are not automatically actuated to provide full fluid flow to the steering valve when the valve is actuated and then divert the flow to the auxiliary circuit when the valve is not actuated.

Another problem with known flow dividers which only give a fixed ratio flow to steering and auxiliary circuits is that they are typically used with closed center steering valves or open center, five line steering valves (inlet, outlet, two steering cylinder lines, and a pressure sensing line). Since it is economically desirable to also use a four line, open center steering valve in the steering circuit, there has been a need for a flow divider which can be used in connection with other types of steering valves than those taught by the prior art.

Thus, the disadvantages of present flow dividers for fluid pressure operated machines such as earth-working equipment have resulted in the priority flow divider of the present invention which provides full fluid flow to the steering valve when the steering valve is being actuated, but when it is not being actuated, all of the flow is diverted to an auxiliary circuit except for a small pilot flow.

SUMMARY OF THE INVENTION

In accordance with the present invention, the priority flow divider is hydraulically connected between the steering valve and the pump for the steering circuit. In a non-steering position, a major portion of the fluid flow in the steering circuit is diverted by the priority flow divider to an auxiliary circuit for supplementing the output of the pump in the auxiliary circuit thereby providing better efficiency and greater productivity. In a steering position, all of the fluid flow is directed by the priority flow divider to the steering valve.

The priority flow divider of the present invention includes a cylindrical housing having a slidable spool valve therein, and the housing further includes an inlet port connected to the pump for the steering circuit, a discharge port connected to the steering valve, and a discharge port connected to an auxiliary hydraulic circuit. The spool valve has three enlarged cylindrical portions including an end portion and an intermediate portion, and the enlarged cylindrical portions are separated by recessed connecting portions of a reduced diameter.

When the steering valve is in its neutral or non-steering position, the enlarged cylindrical portions of the spool valve selectively engage interior wall portions of the cylindrical housing to thereby define an interior fluid connecting chamber between the inlet port from the pump and the discharge port to the auxiliary circuit. The spool valve thereby diverts the fluid flow from the steering circuit pump to the auxiliary circuit and prevents fluid flow to the steering valve except for a small pilot flow. When the steering valve is actuated to cause steering, the enlarged cylindrical portions of the spool valve engage the interior wall portions of the cylindrical housing to define an interior fluid connecting chamber between the inlet port from the pump and the discharge port to the steering valve. All of the fluid pressure is then directed to the steering valve and none is directed to the auxiliary circuit.

The spool valve is spring-biased by a spring assembly at one of its ends such that the enlarged cylindrical portion which is at its other end abuts an interior end portion of the cylindrical housing when the steering valve is in a neutral or non-steering position. A pilot bleed orifice which passes interiorly through the intermediate enlarged cylindrical portion permits a small pilot flow to be discharged to the steering valve and through the open center of the steering valve to a reservoir. The remainder of the fluid flow from the steering circuit pump is diverted to the auxiliary circuit until the steering valve is again actuated.

Actuation of the steering valve causes fluid pressure to build up downstream of the priority flow divider which, in turn, causes the spool valve to shift against the spring assembly thereby shutting off fluid flow to the auxiliary circuit and directing all flow to the steering valve. The spool valve also includes an interior pilot line through its center and a check valve therein which provides steering relief if necessary.

Other advantages and meritorious features of the priority flow divider of the present invention will be more fully understood from the following description of the preferred embodiment, the appended claims, and the drawings, a brief description of which follows.

DETAILED DESCRIPTION OF THE INVENTION

Figure 1:
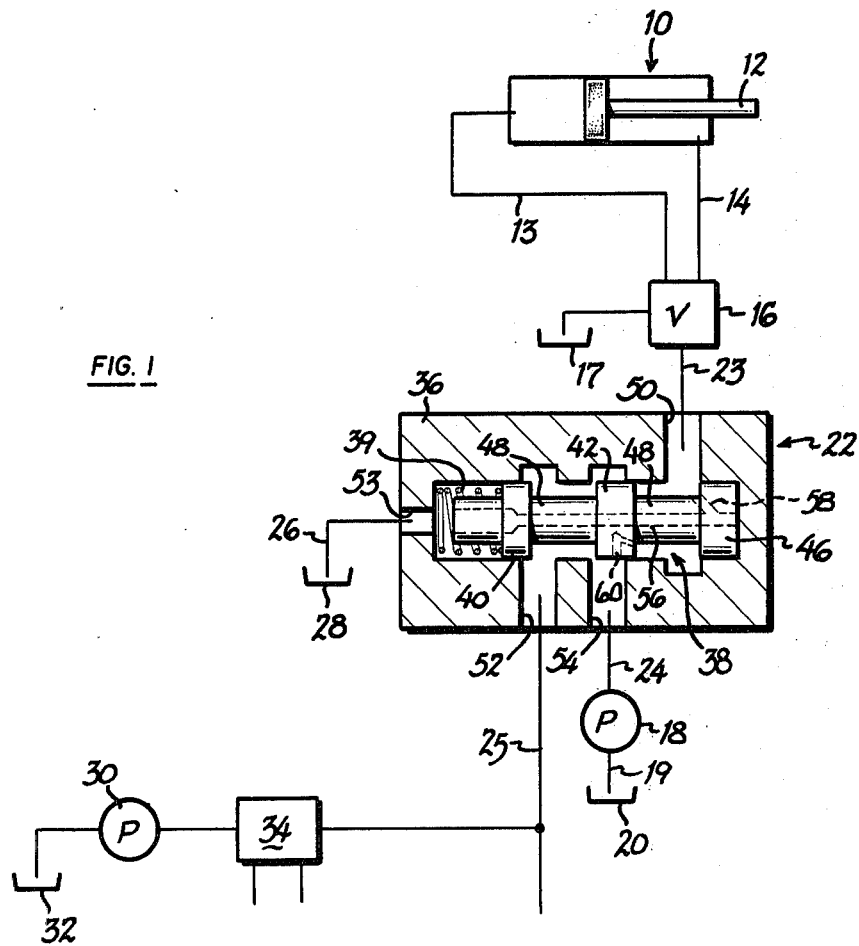
FIG. 1 is a schematic illustration of a hydraulic control system including the priority flow divider of the present invention for dividing hydraulic fluid flow between a steering circuit and an auxiliary hydraulic circuit.
Figure 2:
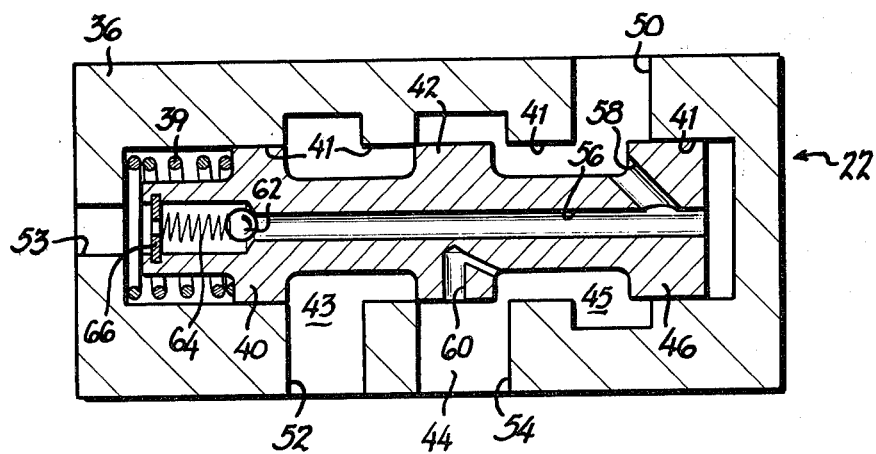
FIG. 2 is a cross-sectional detailed view of the priority flow divider of the present invention illustrating the position of the spool valve when the steering valve is actuated.

A preferred embodiment of the priority flow divider of the present invention is illustrated in FIGS. 1-2.

A steering circuit is partially illustrated in FIG. 1, and it includes a steering cylinder 10 and piston rod 12 (only the right steering cylinder is shown) which is connected by fluid conduits 13 and 14 to a conventional steering valve 16. Steering valve 16 includes four lines (i.e., inlet port, outlet port, right turn port, and left turn port) and an open center which is connected to reservoir 17.

In accordance with the present invention, a priority flow divider 22 is hydraulically connected between the steering valve 16 and pump 18 for the steering circuit. The inlet 19 to pump 18 is connected to a reservoir 20, and pump 18 supplies hydraulic fluid under pressure to priority flow divider 22 through outlet conduit 24. Priority flow divider 22 directs fluid flow to either steering valve 16 through conduit 23 or to an auxiliary circuit through conduit 25. A typical auxiliary circuit is illustrated, and it includes pump 30, reservoir 32 and backhoe or loader control 34.

In a non-steering position as illustrated in FIG. 1, the major portion of the fluid flow from steering pump 18 is diverted by the priority flow divider 22 to the auxiliary circuit for supplementing the output of pump 30 in the auxiliary circuit thereby providing better efficiency and productivity. In a steering position, as illustrated in FIG. 2, all of the fluid flow is directed by priority flow divider 22 to the steering valve 16.

While various means of dividing flow between steering and auxiliary circuits exist, they typically provide a fixed amount of fluid flow to both the steering circuit and to the auxiliary circuit as previously described. That is, only a portion of the fluid flow in the steering circuit can be diverted to the auxiliary circuit. The present flow divider 22 automatically provides full flow to the four line, open center steering valve 16 when steering valve 16 is actuated, but when it is not being actuated, all of the flow is diverted to the auxiliary circuit shown except for a small pilot flow.

As illustrated in FIGS. 1 and 2, the priority flow divider 22 includes a cylindrical housing 36 having a slidable spool valve 38 therein, and housing 36 further includes an inlet port 54 connected to pump 18 for the steering circuit, a discharge port 50 connected to the steering valve 16, and a discharge port 52 connected to the auxiliary hydraulic circuit. Spool valve 38 has three enlarged cylindrical portions 40, 42, 46 including an end portion 46 and an intermediate portion 42. Enlarged cylindrical portions 40, 42, 46 are separated by recessed connecting portions 48 of a reduced diameter.

When the steering valve 16 is in its neutral or non-steering position, the enlarged cylindrical portions of spool valve 38 engage interior wall portions 41 of cylindrical housing 36 to thereby define an interior fluid connecting chamber between inlet port 54 and discharge port 52 as seen in FIG. 1. Spool valve 38 thereby diverts fluid flow from steering circuit pump 18 to the auxiliary circuit and prevents fluid flow to steering valve 16 except for a small pilot flow. When steering valve 16 is actuated to cause steering, enlarged cylindrical portions 40, 42, 46 of spool 38 engage interior wall portions 41 of cylindrical housing 36 to define interior fluid connecting chamber 45 between inlet port 54 and discharge port 50 to steering valve 16. In this position, as illustrated in FIG. 2, all of the fluid flow is directed to steering valve 16 and none is directed to the auxiliary circuit.

Spool valve 38 is spring-biased by spring assembly 39 at one of its ends such that cylindrical end portion 46 abuts an interior end portion of cylindrical housing 36 when steering valve 16 is in its neutral or non-steering position. In the non-steering position illustrated in FIG. 1, pilot bleed orifice 60, which passes through the intermediate enlarged cylindrical portion 42, permits a small pilot flow to be discharged to steering valve 16 and through the open center of steering valve 16 to reservoir 17. The remainder of the fluid flow from steering circuit pump 18 is diverted to the auxiliary circuit until the steering valve is again actuated.

Actuation of the steering valve 16 causes fluid pressure to build up downstream of the priority flow divider 22 in conduit 23 which, in turn, causes spool valve 38 to shift against spring assembly 39 thereby shutting off fluid flow to the auxiliary circuit and diverting all flow to the steering valve 16 as illustrated in FIG. 2. Spool valve 38 also includes an interior pilot line 56, 58 through its center and a check valve 62 therein which provides steering relief if necessary. Check valve 62 is spring-biased against pilot line 56 by spring 64 which is mounted on retainer plate 66. When steering relief becomes necessary, check valve 62 is opened and fluid flow is discharged through port 53 and outlet conduit 26 to reservoir 28.

It will be apparent to those skilled in the art that the foregoing disclosure is exemplary in nature rather than limiting, the invention being limited only by the appended claims.

We claim:

1. In a fluid control system including a steering circuit and an auxiliary circuit, said steering circuit including at least one steering cylinder connected to a steering valve and a first pump means for supplying fluid under pressure to said steering circuit, said auxiliary circuit including a fluid pressure operated load handling mechanism and a second pump means for supplying fluid under pressure to said auxiliary circuit, the improvement comprising:

a priority flow divider for automatically dividing fluid flow between said steering and auxiliary circuits, said flow divider being connected between said first pump means and said steering valve and including an inlet connected to said first pump means, a first discharge conduit connected to said steering valve, and a second discharge conduit connected to said auxiliary circuit;

said flow divider including a housing having a slidable spool valve therein engageable with interior wall portions of said housing, said spool valve having a plurality of enlarged cylindrical portions including an end cylindrical portion and an intermediate cylindrical portion, said enlarged cylindrical portions being connected together by connecting portions of a reduced diameter;

resilient means for shifting said spool valve in a first direction in response to said steering valve being in a neutral on non-actuated position such that said enlarged cylindrical portions of said spool valve engage said interior wall portions to define a fluid connecting chamber between said inlet connected to said first pump means and said second discharge conduit connected to said auxiliary circuit, one of said enlarged cylindrical portions including a pilot bleed orifice for permitting a small pilot fluid flow to be directed to said steering valve whereby all of said fluid flow from said first pump means is being directed to said auxiliary circuit except for said small pilot flow which is directed to said steering valve when said steering valve is in its neutral or non-actuated position; and said spool valve being shifted in a second direction against said resilient means in response to increased pressure in said first discharge conduit upon actuation of said steering valve such that said enlarged cylindrical portions of said spool valve engage said interior wall portions to define a fluid connecting chamber between said inlet connected to said first pump means and said first discharge conduit connected to said steering valve whereby all of the fluid flow from said first pump means is directed to said steering valve;

said steering valve including an inlet port, an outlet port, a right turn port, a left turn port, and an open center which is connected to a reservoir, said small pilot flow passing through said open center to said reservoir when said steering valve is in its neutral or non-actuated position; and said spool valve including an interior pilot line and, valve means mounted within said pilot line for providing steering relief.

* * * * *